3,096,140
PROCESS FOR DYEING POLYOLEFINS
Ermanno Gaetani, Milan, Italy, assignor to Aziende Colori Nazionali Affini, ACNA S.p.A., Milan, Italy, a corporation of Italy
No Drawing. Filed Apr. 14, 1960, Ser. No. 22,128
Claims priority, application Italy Apr. 16, 1959
15 Claims. (Cl. 8—41)

This invention relates to a process for the direct dyeing of a synthetic material obtained by the polymerizing of an olefinic hydrocarbon such as propylene, ethylene, and the like. The dyed polymer may then be worked to obtain textile fibres, films or other suitable shaped articles.

Heretofore, it has been largely impossible to dye satisfactorily articles made of such hydrocarbon polymers as polyethylene and polypropylene. These polymers are made up solely of carbon and hydrogen atoms and, accordingly, do not contain any polar or reactive atoms or radicals, so that they are not capable of forming the usual physico-chemical bonds with the various dyes described in the literature.

The use of plastosoluble dyes which under certain conditions can be "dissolved" in materials not containing reactive groups such as, e.g., polyethylene and polypropylene, has not been very successful because the resulting solutions exhibited little or no "fastness."

Accordingly, it is an object of my invention to provide a process for the direct dyeing of synthetic materials obtained by polymerizing unsaturated hydrocarbons such as ethylene and propylene. Additional objects will become apparent hereinafter.

I have found that certain azoic dyes of particular structural configuration are especially suitable for the direct dyeing hydrocarbon polymers such as polyethylene and polypropylene, and that those dyes may be readily applied to the polymer by simple application of the dye to the polymer at the boiling temperature of the dyeing bath.

This phenomenon is highly surprising because the azo dyes of my invention have a molecule substantially bigger than that of the aforementioned plastosoluble dyes. My dyes are at least disazo derivatives while the plastosoluble azo dyes generally are monoazo derivatives.

The azo dyes to be used in the process of my invention may be represented by the following general formula:

$$X_1R-N=N-R_1-N=N-(R_2N=N)_n-R_3X \quad (1)$$

where

R, $R_1$, $R_2$ and $R_3$ are selected from the group consisting of phenyl, alkyl phenyl, halophenyl, alkylhalophenyl, trifluoromethylphenyl, cycloalkylphenyl, oxyalkylphenyl, nitrophenyl, carboxyphenyl, amidophenyl, alkanoyloxyphenyl, naphthyl, carboxy naphthyl, alkylnaphthyl and tetrahydronaphthyl,
n is zero or 1,
X is selected from the group consisting of hydroxy, amino, alkylamino, oxyalkylamino, arylamino, alkoxyalkylamino and aryl-alkylamino, and
$X_1$ is selected from the group consisting of H and X, where X is defined above.

The tinctorial property of the above disazoic or trisazoic dyes is surprising because simple monoazoic dyes having a similar structure exhibit a very different dyeing behavior towards such fibres. Although such monoazoic dyes may initially appear to dye the fibers, this behavior is illusory, for the colors have practically no fastness against wet treatments and rubbing.

In contrast, if such a monoazo dye (which is not fixable on a polyethylene or polypropylene fibre) contains an amine group and is disazotized and coupled to form certain disazo dyes comprised in the preceding general formula, such a dye surprisingly will dye the said fibre.

I have also found that if free carboxyl groups, —COOH, are introduced into the dyes used in the process of my invention, the presence thereof may exert a very favorable influence upon the affinity of the dye for the polyolefin fibre. This is most unexpected because it is well known that plastosoluble dyes do not function satisfactorily in the presence of ionizable radicals. The exact location of the carboxyl group or groups will determine the degree of affinity of the dye for the fibre. This is demonstrated by a comparison of the following dyes, which are listed in increasing order of affinity:

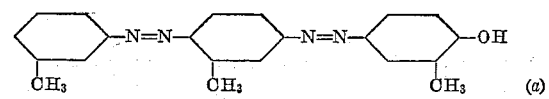

(a)

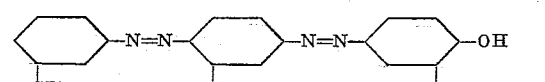

($a_1$)

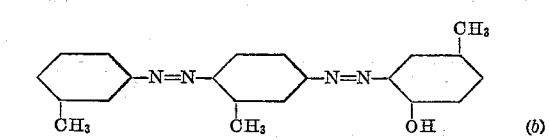

(b)

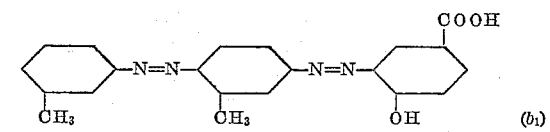

($b_1$)

The difference of affinity between dye ($a_1$) and dye (a) is much higher than that found between dye ($b_1$) and dye (b).

The polyazo dyes are also of considerable interest. One mole of such a dye may be obtained by the known reaction of glucose and alkalies on two molecules of a nitromonoazo dye. These polyazo dyes, in contrast to the nitromonoazo dyes, are quite capable of dyeing polypropylene and polyethylene fibres.

Dyeing baths can be prepared without using the usual swelling agents or carriers, because when certain dyes which are covered by the general Formula 1 are used, good dyeing will occur in the absence of such swelling agents, carriers, etc. However, it is advisable to use the normal wetting or dispersing agents, for the dyes are sparingly soluble or insoluble in the dyeing bath and this facilitates their application.

The following examples will further illustrate my invention. All parts are by weight unless otherwise indicated.

EXAMPLE 1

10 g. polypropylene fibre are immersed in 300 ml. of a dyeing bath containing 0.5 g. of the following dye:

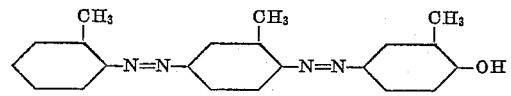

suitably dispersed with 0.2 to 1 g. sodium dinaphthylmethane-sulfonate and the condensation product of ethylene oxide with an aliphatic alcohol having from 12 to 18 carbon atoms in the molecule. The bath is kept at the boiling temperature for 1 hour. The dyed fibre is rinsed and soaped in the presence of a suitable auxiliary medium (e.g., sodium oleyl-methyltaurinate or sodium oleate).

The fibre presents a gold yellow color with good fastness characteristics.

The intermediate monoazo dye

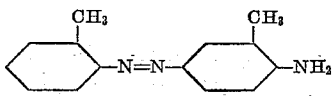

will only slightly stain the fibre.

The same results are obtained with a polyethylene fibre.

EXAMPLE 2

15 g. polypropylene fibres, in the form of staple, are immersed in 300 ml. of a dyeing bath containing 0.9 g. of the following dye:

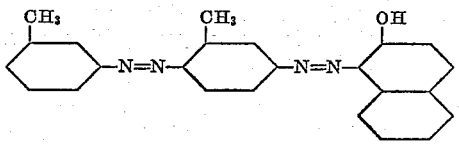

suitably dispersed as in Example 1, or with the aid of another dispersant such as the condensation product of ethylene oxide with castor oil.

Using the procedure of Example 1, the fibre is dyed with a scarlet red color having a good general fastness. With a polyethylene fibre similar dyeing results are obtained.

EXAMPLE 3

10 g. of a polypropylene fibre, are treated in a dyeing bath containing, in 300 ml. 0.1 g. of the following dye

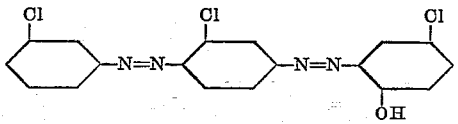

suitably dispersed with 0.2–0.5 g. sodium dinaphthylmethane-disulphonate or 0.2–0.5 g. of the condensation product of ethylene oxide with a fatty alcohol or of another dispersant selected from a number of...

EXAMPLE 6

By operating as in Example 3, scarlet shades are obtained with the following dye:

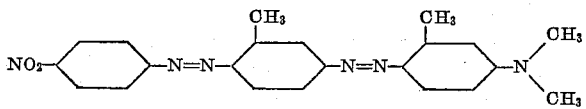

on polypropylene or polyethylene fibers.

EXAMPLE 7

By operating as in Example 3, scarlet shades are obtained with the following dye:

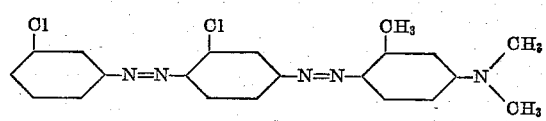

on polypropylene and polyethylene fibres.

EXAMPLE 8

By operating as in Example 3, light red shades are obtained with the following dye:

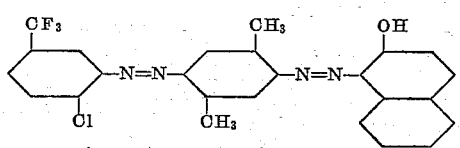

on polypropylene or polyethylene fibres.

EXAMPLE 9

By operating as in Example 3, gold yellow shades are obtained with the following dye:

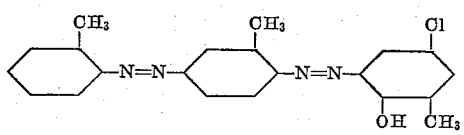

on polypropylene or polyethylene fibres.

EXAMPLE 10

By operating as in Example 3, gold yellow shades are obtained on polypropylene or polyethylene fibres with the following dye:

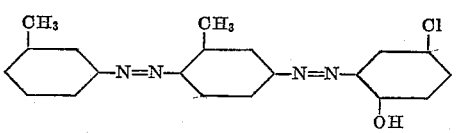

EXAMPLE 11

By operating as in Example 3, yellow shades are obtained on polypropylene or polyethylene fibres with the following dye:

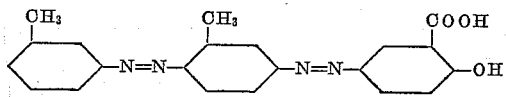

EXAMPLE 12 operating as in Example 3, yellow shades are produced with the following dye:

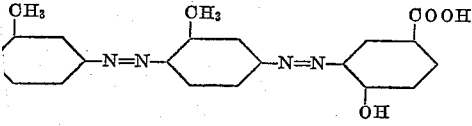

on polypropylene or polyethylene fibres.

--- by operating according to Example 3, makes it possible to dye polyolefin fibres with violet-red shade.

EXAMPLE 31

The disazo dye having the formula:

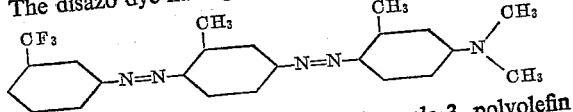

dyes, by operating as described in Example 3, polyolefin fibres with orange shades.

EXAMPLE 32

A dye having the formula:

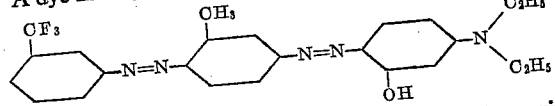

dyes, by operating as in Example 3, polyolefin fibres with scarlet shades.

EXAMPLE 33

A disazo dye having the formula:

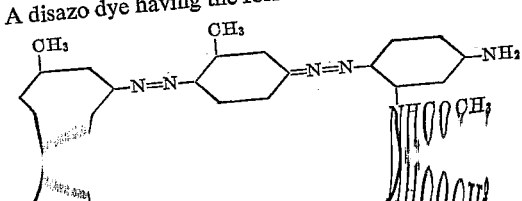

EXAMPLE 13

By operating as in Example 3, with the following dye:

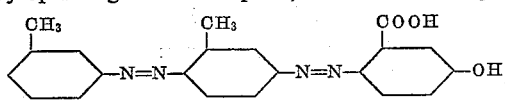

yellow shades are produced on polypropylene and polyethylene fibres.

EXAMPLE 14

By operating as in Example 3, with the following dye:

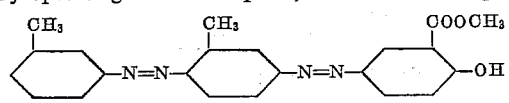

yellow shades are produced on polypropylene and polyethylene fibres.

EXAMPLE 15

By operating as in Example 3, yellow shades are produced with the following dye:

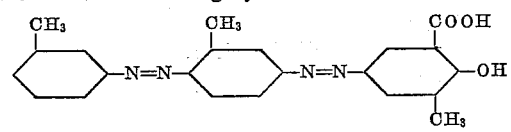

on polypropylene or polyethylene fibres.

EXAMPLE 16

By operating as in Example 3, with the following dye

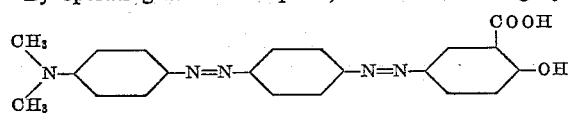

salmon shades are obtained on polypropylene and polyethylene fibres.

EXAMPLE 17

By operating according to Example 3, with the following dye

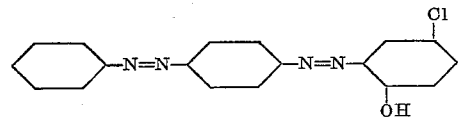

gold-yellow shades are produced on polypropylene or polyethylene fibres.

EXAMPLE 18

By operating according to Example 3 with the following dye:

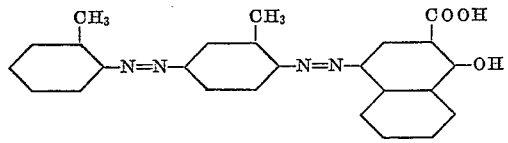

violet-red shades are produced on polypropylene or polyethylene fibres.

EXAMPLE 19

By operating as in Example 3, polypropylene and polyethylene fibres can be dyed with:

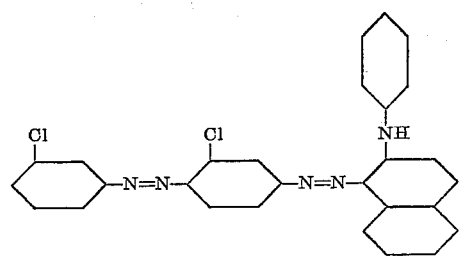

with an intense violet-red shade.

EXAMPLE 20

By operating according to Example 3, polyolefin fibres can be dyed with:

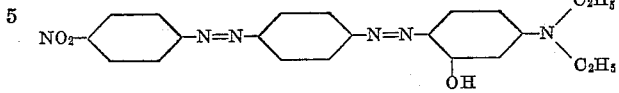

with lilac shade.

EXAMPLE 21

By operating according to Example 3, polyolefin fibres can be dyed with:

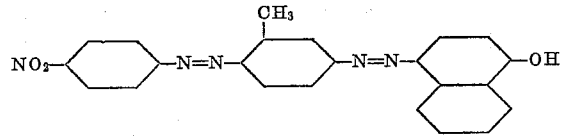

with a red shade.

EXAMPLE 22

By operating as in Example 3, with the following dye:

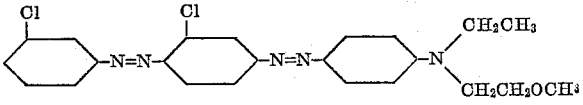

light orange shades can be produced on polyolefin fibres.

EXAMPLE 23

By operating as in Example 3 with the following dye:

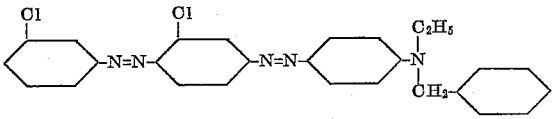

orange shades can be produced on polyolefin fibres.

EXAMPLE 24

By operating as described in Example 3, with the following dye:

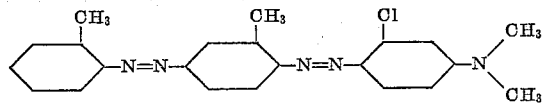

light orange shades can be produced on polyolefin fibres.

EXAMPLE 25

By operating as described in Example 3, with the following dye:

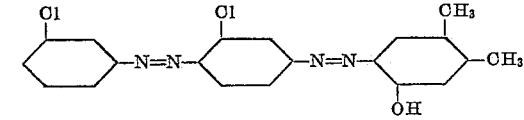

rather red-yellow shades can be produced on polyolefin fibres.

EXAMPLE 26

By operating as in Example 3, with the following dye:

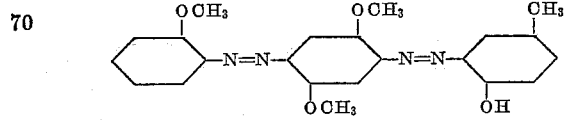

salmon shades can be produced on polyolefin fibres.

EXAMPLE 27

By operating as described in Example 3, with the following dye:

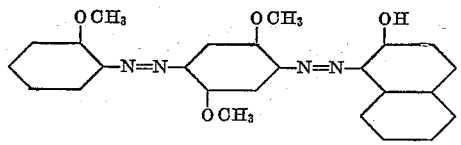

bluish-violet shades of a moderate intensity can be obtained on polyolefin fibres.

EXAMPLE 28

By operating as described in Example 3, with the following dye:

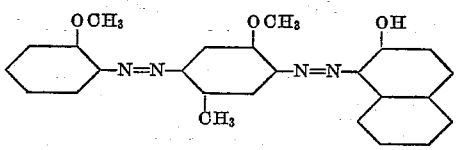

violet shades, more red than those obtained with the dye of Example 24, can be obtained on polyolefin fibres.

EXAMPLE 29

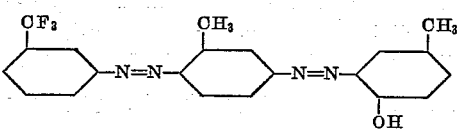

By operating as in Example 3, gold yellow shades can be obtained on polyolefin fibres, with the dye having the above formula.

EXAMPLE 30

By operating as in Example 3, red shades can be obtained on polypropylene and polyethylene materials, with the dye having the formula:

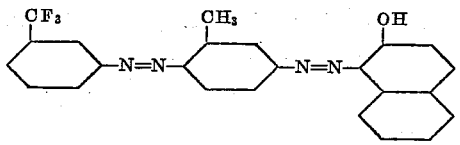

If beta-naphthol is replaced by alpha-naphthol, the dye having the formula:

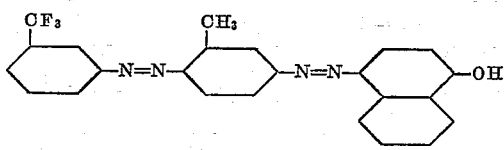

dyes, by operating as in Example 3, a polyolefin material with a moderately violet-red shade.

On the other hand, the following dye:

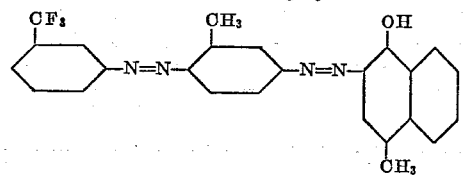

by operating according to Example 3, makes it possible to dye polyolefin fibres with violet-red shade.

EXAMPLE 31

The disazo dye having the formula:

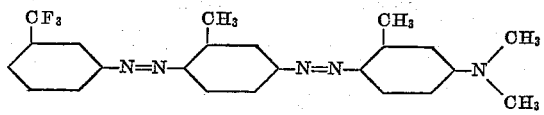

dyes, by operating as described in Example 3, polyolefin fibres with orange shades.

EXAMPLE 32

A dye having the formula:

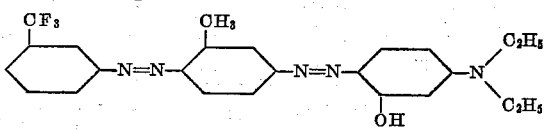

dyes, by operating as in Example 3, polyolefin fibres with scarlet shades.

EXAMPLE 33

A disazo dye having the formula:

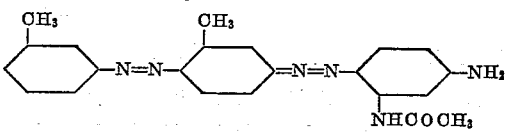

dyes the polyolefin fibres with salmon shades.

EXAMPLE 34

The dye having the formula:

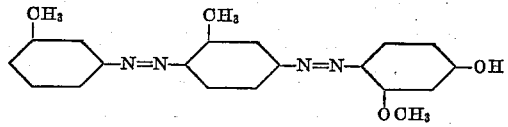

dyes polyolefin fibres with a rather reddish yellow colour.

EXAMPLE 35

The disazo dyes having the formula:

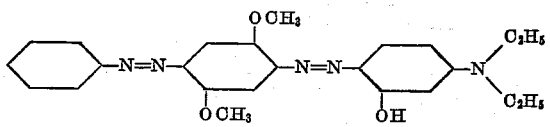

dyes polyolefin fibres with a bordeaux shade.

EXAMPLE 36

The disazo dye having the formula:

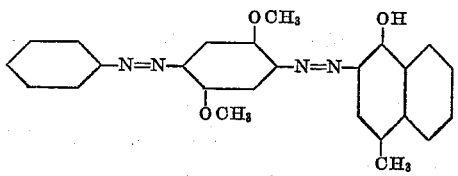

produces on polyolefin materials, by operating as in Example 3, violet shades.

Other dyes suitable for dyeing polyolefin fibres according to the invention are reported in Table 1.

*Table 1*

| No. | Dye | Color |
|---|---|---|
| 1 | 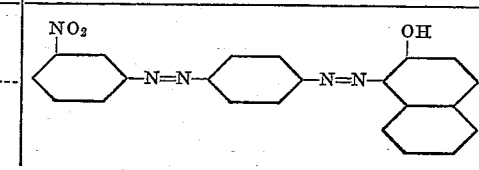 | Violet red. |

*Table I*—Continued

| No. | Dye | Colour |
|---|---|---|
| 2 | (structure: 4-Cl-C6H4-N=N-2-Cl-C6H4-N=N-1-naphthol) | Scarlet. |
| 3 | (structure: 2-hydroxy-naphthyl-N=N-C6H4-N=N-C6H3(COOH)(OH)) | Yellowish red. |
| 4 | (structure: C6H5-N=N-C6H4-N=N-C6H3(COOH)(OH)) | Yellow. |
| 5 | (structure: 2-CH3-C6H4-N=N-2-CH3-C6H4-N=N-C6H3(COOC2H5)(OH)) | Do. |
| 6 | (structure: C6H5-N=N-C6H4-N=N-hydroxynaphthyl-COOH) | Violet red. |
| 7 | (structure: 2-CH3-C6H4-N=N-2-CH3-C6H4-N=N-C6H3(COOH)(OH)) | Yellow. |
| 8 | (structure: 2-CH3-C6H4-N=N-2-CH3-C6H4-N=N-2-CH3-C6H3-NH2) | Orange. |
| 9 | (structure: (CH3)2N-C6H4-N=N-C6H4-N=N-2-CH3-C6H3-OH) | Reddish orange. |
| 10 | (structure: C6H5-N=N-C6H4-N=N-C6H4-NHC2H5) | Violet red. |
| 11 | (structure: C6H5-N=N-C6H4-N=N-naphthyl with two NH-C(CH3)2 bridge) | Grey. |
| 12 | (structure: 2-CH3-C6H4-N=N-2-CH3-C6H4-N=N-C6H2(OC2H5)2-NH2) | Red. |
| 13 | (structure: (C2H5)2N-C6H4-N=N-C6H4-N=N-hydroxynaphthyl) | Red. |
| 14 | (structure: CH3-C6H3(CH3)-N=N-C6H2(CH3)2-N=N-C6H3(CH3)(OH)) | Yellow. |
| 15 | (structure: CH3-C6H3(CH3)-N=N-C6H3(CH3)-N=N-hydroxynaphthyl-OH) | Brilliant red. |

3,096,140
Table I—Continued
| No. | Dye | Colour |
|---|---|---|
| 16 | 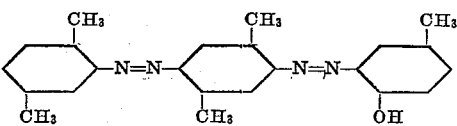 | Yellow. |
| 17 | 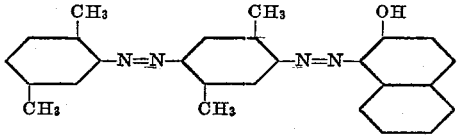 | Brilliant red. |
| 18 | 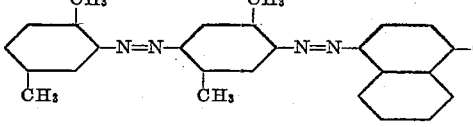 | Rubin. |
| 19 | 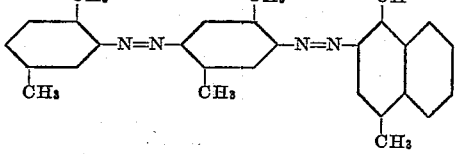 | Do. |
| 20 | 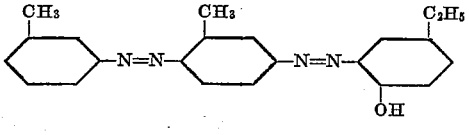 | Yellow. |
| 21 | 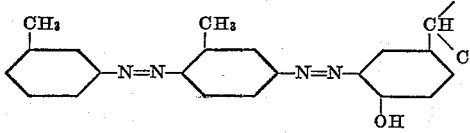 | Do. |
| 22 | 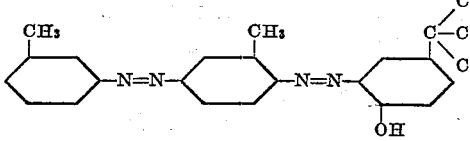 | Do. |
| 23 | 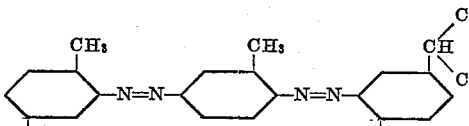 | Do. |
| 24 | 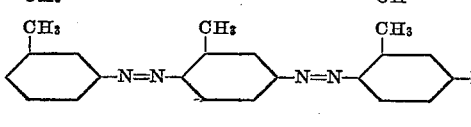 | Orange. |
| 25 | 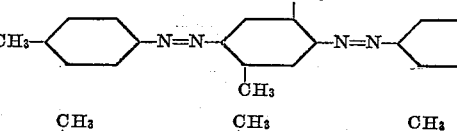 | Do. |
| 26 | 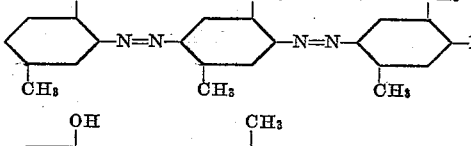 | Do. |
| 27 | 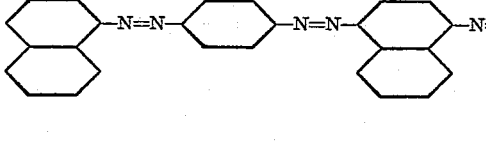 | Violet. |

Table I—Continued

| No. | Dye | Colour |
|---|---|---|
| 28 | [structure] | Bluish red. |
| 29 | [structure] | Scarlet. |
| 30 | [structure] | Orange. |
| 31 | [structure] | Yellow. |
| 32 | [structure] | Brilliant red. |
| 33 | [structure] | Orange red. |
| 34 | [structure] | Orange. |
| 35 | [structure] | Violet. |

Some dyeing runs with the polyazo dyes obtained by reaction of glucose and alkalies on nitro-monoazo dyes, are reported in Table II, below:

Table II

| No. | Nitro-monoazo dye which does not tinge | Colors obtained after reacting the nitro-monoazo dye with alkalies and glucose |
|---|---|---|
| 1 | [structure] | Reddish yellow. |
| 2 | [structure] | Red. |
| 3 | [structure] | Violet red. |

Variations can, of course, be made without departing from the spirit of my invention.

Having thus described my invention, what I desire to secure and claim by Letters Patent is:

1. A process for dyeing olefin polymers which comprises contacting said polymers in an aqueous dye bath which is maintained at its boiling temperature with a disazo dye having the formula:

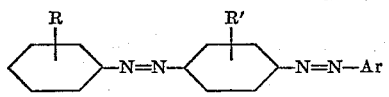

wherein R is a member selected from the group consisting of H, CH₃, CF₃ and Cl, R' is a member selected from the group consisting of H, CH₃ and Cl, and Ar is a member selected from the group consisting of (a)

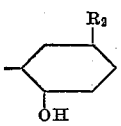

wherein R₂ is selected from the group consisting of CH₃, COOH and Cl (b)

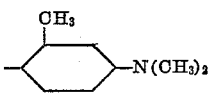

(c)

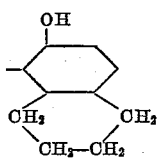

and (d)

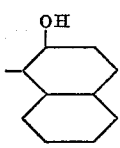

2. A process according to claim 1 wherein the olefin polymer is polyethylene.

3. A process according to claim 1 wherein the olefin polymer is polypropylene.

4. A process according to claim 1, wherein the disazo dye employed has the formula:

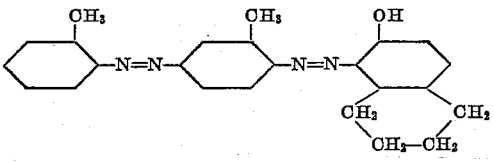

5. A process according to claim 1, wherein the disazo dye employed has the formula:

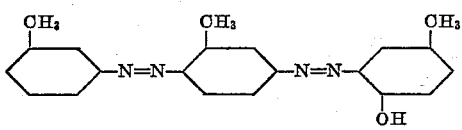

6. A process according to claim 1, wherein the disazo dye employed has the formula:

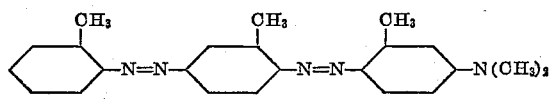

7. A process according to claim 1, wherein the disazo dye employed has the formula:

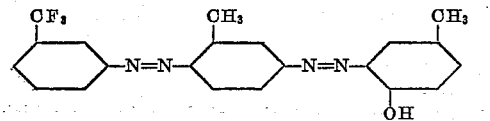

8. A process according to claim 1, wherein the disazo dye employed has the formula:

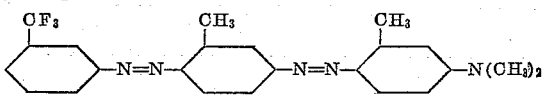

9. A process according to claim 1, wherein the disazo dye employed has the formula:

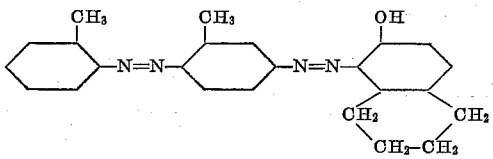

10. A process according to claim 1, wherein the disazo dye employed has the formula:

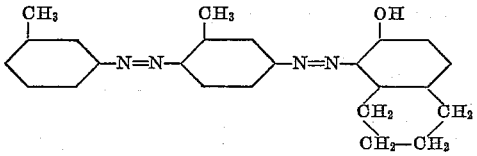

11. A process according to claim 1, wherein the disazo dye employed has the formula:

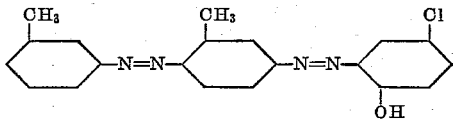

12. A process according to claim 1, wherein the disazo dye employed has the formula:

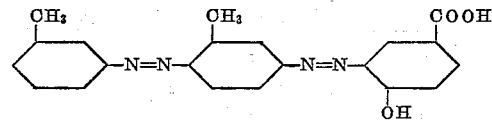

13. A process according to claim 1, wherein the disazo dye employed has the formula:

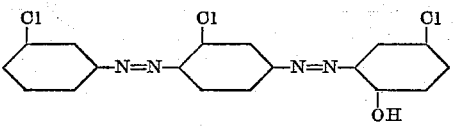

14. A process according to claim 1, wherein the disazo dye employed has the formula:

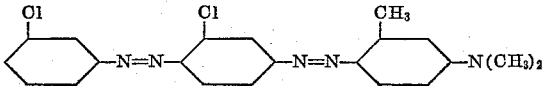

15. A process according to claim 1, wherein the disazo dye employed has the formula:

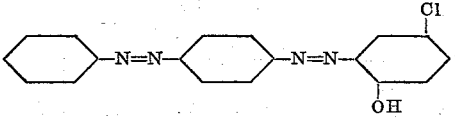

References Cited in the file of this patent

UNITED STATES PATENTS

| | | |
|---|---|---|
| 1,735,963 | Dreyfus | Nov. 19, 1929 |
| 2,635,942 | Thummel | Apr. 21, 1953 |
| 2,782,185 | Merian | Feb. 19, 1957 |
| 2,954,371 | Liechti | Sept. 27, 1960 |

FOREIGN PATENTS

| | | |
|---|---|---|
| 445,345 | Great Britain | Mar. 30, 1936 |
| 809,495 | Great Britain | Feb. 25, 1959 |

OTHER REFERENCES

Woodruff: Amer. Dyestuff Reporter, April 22, 1946, pp. P194–P197, P204 and P205.

Woodruff, J.S.D.C., p. 299, September 1946.